United States Patent Office 3,331,116
Patented July 18, 1967

3,331,116
CUTTING TOOL HOLDER
Herbert Füssenhäuser, Esslingen, and Hermann Reim, Plochingen, Germany, assignors to Feldmuehle Aktiengesellschaft, Dusseldorf, Germany
Filed Dec. 14, 1966, Ser. No. 601,680
Claims priority, application Germany, Dec. 17, 1965, F 29,294
12 Claims. (Cl. 29—96)

ABSTRACT OF THE DISCLOSURE

A tool holder arrangement for holding a tool bit in a first recess of a supporting tool holder bar by means of a clamp which has a stem portion received in a second recess of the bar and is axially guided in the second recess by guide ribs while being secured against angular movement. A chip breaker is held against the clamp by a resilient U-shaped clip whose leg portions pass through bores in the guide ribs, and whose bight portion is secured on the clamp against movement longitudinally of the leg portions.

---

The invention relates to cutting tools, such as tools for a lathe, and particularly to a tool holder capable of supporting interchangeable tool bits.

In its more specific aspects, the invention relates to an improvement in tool holders in which a tool bit is received in a recess of a supporting bar, and is held fast in the recess by a clamp, a releasably secured chip breaker being interposed between the tool bit and the clamp, and the latter being secured to the supporting bar by a clamping screw threadedly engaging the bar.

The known tool holder arrangements of the type described permit displacement of the chip breaker relative to the bar or to the tool bit unless the supporting bar projects far enough beyond the tool bit to provide an abutment face for engagement with the chip breaker. The resulting assembly is relatively bulky.

In some known arrangements, the chip breaker is loosely interposed between the tool bit and the clamp, and may be lost when the clamp is loosened for release of the bit. When a clip is provided to retain the chip breaker on the clamp in the loosened condition of the latter, the clip may interfere with discharge of chips, and chips wedging in the clip may change the position of the chip breaker or actually dislodge the clip. When the known chip breakers are loosened for replacement or turning of the tool bit, they are not readily returned to their original position when the clamp is tightened.

The invention provides a tool holder arrangement which overcomes the afore-described and other known shortcomings of known tool holders of similar type by providing the clamp with a stem received in a recess of the supporting tool holder bar and with fixed guides angularly offset on the stem about the axis of the recess which engage axially elongated grooves in the tool holder bar so that axial movement of the clamp is guided by the engaged guides and grooves, and angular movement of the clamp about the axis of the recess is prevented.

The chip breaker is urged into engagement with a face of the clamping portion proper of the aforementioned clamp by an approximately U-shaped resilient clip whose leg portions extend through bores in the aforementioned guides and whose bight portion is received in a channel defined at least in part by an axially projecting lug on the clamp, the arrangement being such that the aforementioned recess is spaced in a certain direction from the recess of the tool holder bar which normally receives the tool bit, the bores of the guides extend through the bars in the same direction, and the channel receiving the bight portion of the clip is further offset in the same direction from the guides and is closed by the lug in this direction.

This arrangement not only prevents loss of the chip breaker when the clamp is loosened, but it also holds the chip breaker as well as the clamp in a well defined angular relationship to the supporting tool holder bar, permitting only relative movement in the direction of the aforementioned axis so that the chip breaker is returned to the precise position it occupied prior to loosening of the clamp when the latter is tightened again.

Further features of the invention which contribute to the return of the chip breaker to its original position after loosening and retightening of the clamp and which help to hold the chip breaker in position during cutting will become apparent from the following detailed description of preferred embodiments of the invention when considered in conjunction with the appended drawing in which.

Figure 1:
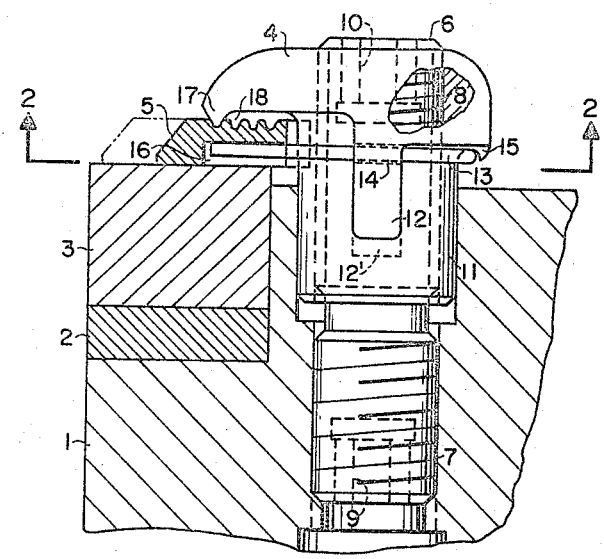
FIG. 1 shows a tool holder arrangement of the invention in elevational section, the tool holder bar being partly broken away.
Figure 2:
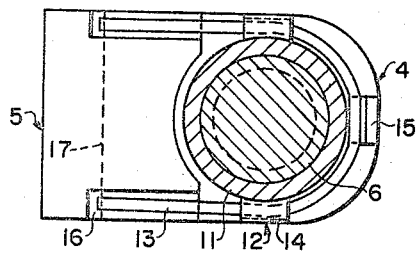
FIG. 2 shows the apparatus of FIGURE 1 in sectional plan view on the line II—II.

Referring now to the drawing in detail, and initially to FIGURES 1 and 2, there is seen one end of a tool holder bar 1, an edge of which is recessed to receive a steel backing plate 2 and a plate-shaped cutting tool bit 3 of tungsten carbide, sintered aluminum oxide or similar hard and brittle material. Another recess of the bar 1 partly receives a clamp 4. A chip breaker 5 is interposed between the clamping portion proper of the clamp 4 and the tool bit 3 and may be made of similar material as the bit 3.

A clamping screw 6 holds the afore-described elements in fixed relative relationship during normal tool operation. The screw 6 has two axial portions provided with respective external threads 7, 8 which are of equal sense, both being right-handed, but differ in pitch. The pitch of the threads 7 which engage mating internal threads in the bar 1 is 1.25 millimeters, the pitch of the threads 8 is 1 millimeter. The two radial end faces of the screw 6 have hexagonal recesses 9, 10 for conforming engagement by wrenches or keys when the screw 6 is to be turned.

The threads 8 engage mating internal threads on a tubular stem portion 11 of the clamp 4. When the screw 6 is turned, the clamp 4 moves axially 0.25 millimeter during each revolution, and the clamping portion thereof moves correspondingly toward or away from the tool bit 3. Because of the mechanical advantage of this arrangement, the tool bit and the chip breaker 5 can be clamped very firmly without applying great torque to the screw 6.

Rotation of the clamp stem 11 with the screw 6 is prevented by engagement of two integral guide ribs 12 on the stem 11 with corresponding grooves 12' in the bar 1. The ribs 12 are arranged in a common axial plane and are axially slidable in the grooves 12'. The angular position of the clamp 4 relative to the bar 1 is thus maintained in all operative axial positions of the clamp. The axial length of the stem 11 received in the recess of the bar 1 and the length of the ribs 12 are sufficient to prevent lateral displacement of the clamp 4 under the normal cutting stresses, and the stem 11 provides precise guidance for the screw 6.

The chip breaker 5 is attached to the clamp 4 in all operative positions of the latter by a U-shaped clip 13 of spring steel wire. The two legs of the U-shape pass through parallel bores 14 in the guide ribs 12. The ribs are arranged diametrically opposite each other on the tubular stem 11, as is best seen in FIGURE 2, and their bores are arranged in a common plane which is almost but not quite perpendicular to the stem axis. A downwardly directed face on a portion of the clamp 4 remote from the clamping portion proper carries a projecting lug 15 which defines a channel open in a downward direction, and laterally closed on one side by the stem 11 and on the other side by the lug 15. The bight portion of the clip 13 is confined in the channel and cannot normally move downward therefrom because of the engagement of the leg portions with the bores 14.

The channel is downwardly offset from the bores 14 to a sufficient extent to cause a slight upward tilt of the leg portions in a direction toward the chip breaker 5. The free ends of the leg portions engage openings 16 in the face of the chip breaker 5 which is directed toward the tool bit 3. The free ends of the clip 13 make contact with the chip breaker 5 in respective points or small areas only. These areas or points are aligned in the direction of movement of the clamp 4 with a rib 17 on the underside of the clamping portion of the clamp 4. The rib 17 engages one of four juxtaposed parallel notches 18 on the top face of the chip breaker 5. The crest of the rib 17 is indicated by a broken line in FIGURE 2.

Because of the alignment between the free ends of the clip 13 and the line of engagement between the rib 17 and the chip breaker 5 in one of the notches 18, the resilient force of the clip holds the chip breaker 5 to the clamp 4 when the latter is loosened for replacement of the tool bit 3 or for any other purpose, but the clip does not tend to pivot the chip breaker about the crest of the rib 17. The rib 17 and the engaged notch 18 prevent angular displacement of the chip breaker relative to the clamp 4 under cutting stresses in the normal operating condition of the illustrated apparatus, and adequately prevent accidental rotary displacement while the clamp is loosened.

The chip breaker may be shifted in the plane of FIGURE 1 between the extreme positions shown in fully drawn and chain dotted lines respectively, and the four positions available by engagement of the rib 17 with respective notches 18 are fully reproducible.

Displacement of the chip breaker in the direction of elongation of the rib 17 is limited by the free ends of the clip 13, and may be prevented entirely, if so desired, by having the ends of the clip converge from the bores 14 toward the chip breaker 5. The free ends may be bent toward each other, or the axes of the bores 14 may be made to converge in an obvious manner.

The leg portions of the clip 13 being firmly retained in the bores 14 by the confinement of the bight portion in the channel adjacent the lug 15, a chip cannot tear the clip from its intended operating position if it can reach the clip. The clip, however, is protected against contact with cut chips by the clamp 4 and the ribs 12.

When it is desired to turn or replace the tool bit 3, the screw 6 is turned until the clamp 4 and the chip breaker 5 are jointly lifted from the bit without turning about the axis of the stem 11, and the turned or replaced tool bit is clamped tight again by rotating the screw 6 in the opposite direction. When it is desired to change the position of the chip breaker 5 on the tool bit 3, the clamp 4 is loosened until the rib 17 can clear the ridges between the notches 18 when the chip breaker 5 is depressed against the resilient restraint of the clip 13. The free ends of the clip provide adequate lateral guidance to prevent shifting of the chip breaker during this operation.

Figure 3:
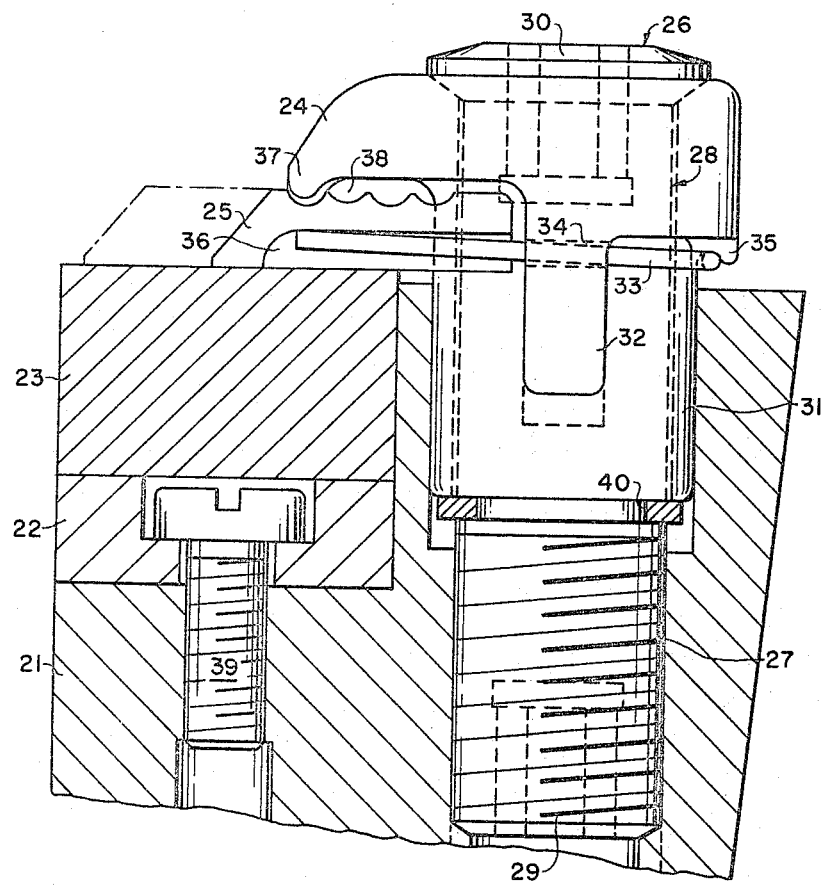
FIG. 3 shows a modified tool holder arrangement in a view corresponding to that of FIGURE 1.

The modified tool holder arrangement shown in FIGURE 3 is closely similar to that described above with reference to FIGURES 1 and 2. A first recess in an edge portion of the tool holder bar 21 receives a backing plate 22 and a tool bit 23. The backing plate is fastened to the supporting bar 21 by a screw 39. The clamp 24 which secures the tool bit 23 on the bar 21 has a rounded rib 37 on the face thereof opposite the tool bit 23 which engages one of four notches 38 in a chip breaker 25. The bottoms of the notches 38 are rounded to permit pivoting movement of the chip breaker on the clamp 24, but such movement is not induced by the free ends of a clip 33, substantially identical with the aforedescribed clip 13, which abuttingly engage the chip breaker 25 in openings 36 of the latter in alignment with the rib 37 and the engaged notch 38.

The legs of the U-shaped clip 33 are held in bores 34 of guide ribs 32 in the stem portion 31 of the clamp 24, and the bight portion of the clip is confined in a downwardly open channel formed between a lug 35 on the clamp 24 and its stem portion 31.

The clamp 31 is tubular, and its bore is generally smooth and cylindrical, but flares at its open top for conforming engagement with the enlarged head 30 of a clamping screw 26. The shank portion 28 of the screw which is coaxially received in the bore of the stem 31 is cylindrical and smooth, and the axial end portion 29 of the screw remote from the head 30 carries threads 27 which matingly engage corresponding threads in the second recess of the bar 22 in which most of the stem portion 31 and its guide ribs 32 are received. A circumferential groove in the smooth shank portion 28 adjacent the threads 27 receives a snap ring 40 which axially abuts against an annular end face of the stem portion 31, and holds the clamp 24 in axially abutting engagement with the head 30 of the screw 26.

When the screw 6 is turned by means of a hexagonal key inserted into mating openings in the head 30 or the end portion 29, the axial component of the screw movement is transmitted to the clamp 4 by the ring 40 or the head 30, the clamp being prevented from participating in the rotary component of the screw movement by the engagement of the ribs 32 with conforming grooves in the bar 22.

The cooperation of a rounded rib 37 with a rounded groove 38 is preferred when the chip breaker is made of very brittle material, such as some grades of tungsten carbide or from aluminum oxide because it reduces stress concentration on the chip breaker surface and avoids cracking or spalling of the brittle material under excessive clamping pressure.

The clamps 4, 24 are substantially symmetrical relative to the planes of FIGURES 1 and 3 respectively, and the illustrated tool holder arrangements may therefore be employed for cutting in both directions transverse of the drawing plane. The plate shaped tool bits 3, 23 illustrated may be replaced by others whose cross section is not a rectangle but a square, rhombus, triangle or other shape of suitable dimensions. The necessary modifications in the shape of the chip breakers 5, 25 are evident. No other significant changes in the illustrated devices are involved.

The clamps 4, 24 and their screws 6, 26 and other associated elements are spaced from the tool bit receiving recess of the bars 2, 22 transversely of the direction of clamp movement so that the bar presents an uninterrupted backing surface to the tool bit for firm support. The clamping portions of the clamps 4, 24 and the chip breakers 5, 25 are offset from the supporting bars 2, 22, thereby permitting free access to the chip breaker 5, yet making the arrangement very compact. The clips 13, 33 are fully protected against displacement by cut chips during normal use of the tool bits 3, 33.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A tool holder arrangement comprising, in combination:

(a) a supporting member formed with a first recess and a second recess having an axis and being spaced from said first recess in a predetermined direction transverse of said axis,
   (1) said first recess being adapted to receive a tool bit;
(b) a clamp member having a stem portion received in said second recess for axial movement inward and outward of the same, and a clamping portion extending from said stem portion oppositely to said direction and moving toward and away from a tool bit received in said first recess during said axial movement;
(c) two guide members fixed on said stem portion in angularly offset relationship relative to said axis and formed with respective bores extending therethrough in said direction,
   (1) said supporting member being formed with axially elongated grooves respectively receiving said guide members for guiding said axial movement of the clamp member and for preventing angular movement of said clamp member about said axis;
(d) lug means axially projecting from a portion of said clamp member offset from said guide members in said direction,
   (1) said lug means defining a channel closed in said direction;
(e) an approximately U-shaped resilient clip member having two leg portions and a bight portion connecting the leg portions,
   (1) said leg portions respectively extending through said bores, and the bight portion being received in said channel, the leg portions having respective free ends remote from said bight portion; and
(f) a chip breaker,
   (1) said clamping portion having a face opposite said first recess, and
   (2) said free ends of said leg portions engaging said chip breaker and urging the same into engagement with said face.

2. An arrangement as set forth in claim 1, wherein said guide members are arranged in a common axial plane.

3. An arrangement as set forth in claim 2, wherein said bores are offset from said channel in an axial direction, and said free ends are offset from said bores in said axial direction.

4. An arrangement as set forth in claim 1, wherein said face includes a rib projecting from said clamping portion toward said first recess, said rib being elongated in a direction transverse of said predetermined direction, said free ends being aligned with said rib in the direction of movement of the clamping portion.

5. An arrangement as set forth in claim 4, wherein said chip breaker is formed with a plurality of juxtaposed notches elongated in said transverse direction and open toward said face, said rib being received in one of said notches under the urging of said free ends of the clip member.

6. An arrangement as set forth in claim 5, wherein the bottoms of said notches are rounded, and said rib is dimensioned for pivotal engagement with the notches when received therein.

7. An arrangement as set forth in claim 1, further comprising a clamping screw, said stem portion being tubular, and said clamping screw having a first axial portion received in said stem portion and a second axial portion threadedly engaging said supporting member in said second recess thereof, and motion transmitting means connecting said screw to said stem portion for axial movement of said clamp member during threaded movement of said screw.

8. An arrangement as set forth in claim 7, wherein said first portion of said screw is freely rotatable in said stem portion, and said motion transmitting means include cooperating abutment means on said screw and on said clamp member.

9. An arrangement as set forth in claim 7, wherein said portions of said screw are formed with respective threads, one of said threads threadedly engaging said stem portion and the other thread engaging said supporting member, said threads differing in pitch.

10. An arrangement as set forth in claim 9, wherein the pitch of said one thread is smaller than the pitch of said other thread.

11. An arrangement as set forth in claim 1, wherein said chip breaker is formed with two openings open toward said first recess, said free ends being respectively received in said openings.

12. An arrangement as set forth in claim 1, wherein said clamping portion and said chip breaker are offset from said supporting member in an axial direction outward of said second recess and away from a tool bit received in said first recess.

References Cited
UNITED STATES PATENTS

| | | | |
|---|---|---|---|
| 3,187,407 | 6/1965 | Ducet | 29—96 |
| 3,191,262 | 6/1965 | Gustafson | 29—96 |
| 3,193,909 | 7/1965 | Mihic | 29—96 |

HARRISON L. HINSON, *Primary Examiner.*